United States Patent
Huang et al.

(10) Patent No.: US 10,666,588 B2
(45) Date of Patent: May 26, 2020

(54) METHOD FOR SHARING MEDIA CONTENT, TERMINAL DEVICE, AND CONTENT SHARING SYSTEM

(71) Applicant: Huawei Technologies Co., Ltd., Shenzhen (CN)

(72) Inventors: Bo Huang, Hangzhou (CN); Qiulin Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 583 days.

(21) Appl. No.: 14/480,890

(22) Filed: Sep. 9, 2014

(65) Prior Publication Data

US 2015/0032805 A1     Jan. 29, 2015

Related U.S. Application Data

(63) Continuation of application No. PCT/CN2014/072478, filed on Feb. 25, 2014.

(30) Foreign Application Priority Data

Jul. 23, 2013   (CN) .......................... 2013 1 0311058

(51) Int. Cl.
*G06F 15/16* (2006.01)
*H04L 12/58* (2006.01)
(Continued)

(52) U.S. Cl.
CPC .......... *H04L 51/10* (2013.01); *H04L 65/4084* (2013.01); *H04L 67/2847* (2013.01); *H04L 51/32* (2013.01)

(58) Field of Classification Search
CPC ............................ H04L 51/10; H04L 65/4084
(Continued)

(56) References Cited

U.S. PATENT DOCUMENTS

2002/0147771 A1*  10/2002  Traversat .............. G06F 9/4416
                                                                        709/203
2005/0091683 A1    4/2005  Sheynman et al.
(Continued)

FOREIGN PATENT DOCUMENTS

CN        1879411 A     12/2006
CN      101059808 A     10/2007
(Continued)

OTHER PUBLICATIONS

Foreign Communication From a Counterpart Application, European Application No. 14757821.5, Extended European Search Report dated Oct. 14, 2015, 5 pages.
(Continued)

*Primary Examiner* — Dustin Nguyen
*Assistant Examiner* — Joel Mesa
(74) *Attorney, Agent, or Firm* — Conley Rose, P.C.

(57) ABSTRACT

A method for sharing media content, a terminal device, and a content sharing system are provided. A method for sharing media content may include: obtaining, by a first terminal device, M network addresses from the N second terminal devices; obtaining, based on the M network addresses, M pieces of media content from a content server, editing the M pieces of media content obtained from the content server to obtain first media content, and generating editing information according to an editing manner used when the first media content is obtained; sending the editing information to the content server; receiving a second network address sent by the content server; and publishing the second network address on a social networking server. The solutions of the embodiments of the present invention enhance flexibility of content sharing and user interactivity in a social networking service scenario.

16 Claims, 9 Drawing Sheets

(51) Int. Cl.
*H04L 29/08* (2006.01)
*H04L 29/06* (2006.01)

(58) Field of Classification Search
USPC .................................................. 709/203, 201
See application file for complete search history.

(56) References Cited

U.S. PATENT DOCUMENTS

| | | | |
|---|---|---|---|
| 2005/0198132 A1 | 9/2005 | Vellante et al. | |
| 2008/0005114 A1* | 1/2008 | Li | H04L 67/104 |
| 2008/0114720 A1 | 5/2008 | Smith et al. | |
| 2008/0162557 A1 | 7/2008 | Boda et al. | |
| 2008/0256086 A1 | 10/2008 | Miyoshi et al. | |
| 2009/0313546 A1 | 12/2009 | Katpelly et al. | |
| 2010/0049825 A1 | 2/2010 | Todoroki | |
| 2010/0165396 A1 | 7/2010 | Yamaguchi | |
| 2011/0106911 A1 | 5/2011 | Sung et al. | |
| 2011/0161409 A1* | 6/2011 | Nair | G06F 8/38 |
| | | | 709/203 |
| 2011/0182205 A1 | 7/2011 | Gerdes et al. | |
| 2011/0271303 A1 | 11/2011 | Isozu et al. | |
| 2012/0030587 A1 | 2/2012 | Ketkar | |

FOREIGN PATENT DOCUMENTS

| | | |
|---|---|---|
| CN | 101127875 A | 2/2008 |
| CN | 101286171 A | 10/2008 |
| CN | 101610395 A | 12/2009 |
| CN | 101611609 A | 12/2009 |
| CN | 101622870 A | 1/2010 |
| CN | 101656646 A | 2/2010 |
| CN | 102238420 A | 11/2011 |
| CN | 102790768 A | 11/2012 |
| CN | 103179213 A | 6/2013 |
| CN | 103412746 A | 11/2013 |
| EP | 1980971 A2 | 10/2008 |
| EP | 2157737 A1 | 2/2010 |
| EP | 2475146 A1 | 7/2012 |
| JP | 2008262280 A | 10/2008 |
| JP | 2010049526 A | 3/2010 |
| KR | 20080035287 A | 4/2008 |
| KR | 20080092270 A | 10/2008 |
| KR | 20110047703 A | 5/2011 |
| KR | 20120087307 A | 8/2012 |

OTHER PUBLICATIONS

Partial English Translation and Abstract of Chinese Patent Application No. CN101059808, Feb. 22, 2016, 13 pages.
Partial English Translation and Abstract of Chinese Patent Application No. CN101127875, Feb. 22, 2016, 8 pages.
Sheng, F., et al., "The Design and Implement of Service Discovery Protocol—Applied to Home Network Based on Bluetooth," Academic Journal Electronic Publishing House, 2003, pp. 173-176.
Foreign Communication From a Counterpart Application, Chinese Application No. 201310311058.3, Chinese Office Action dated Jan. 14, 2016, 10 pages.
Foreign Communication From a Counterpart Application, Chinese Application No. 2015-527789, Chinese Notice of Allowance dated Jul. 19, 2016, 3 pages.
Foreign Communication From a Counterpart Application, Chinese Application No. 201310311058.3, Chinese Office Action dated Oct. 8, 2016, 12 pages.
Partial English Translation and Abstract of Japanese Patent Application No. JPA2008262280, Apr. 6, 2016, 142 pages.
Partial English Translation and Abstract of Japanese Patent Application No. JPA2010049526, Apr. 6, 2016, 143 pages.
Foreign Communication From a Counterpart Application, Japanese Application No. 2015-527789, Japanese Office Action dated Jan. 26, 2016, 5 pages.
Foreign Communication From a Counterpart Application, Japanese Application No. 2015-527789, English Translation of Japanese Office Action dated Jan. 26, 2016, 6 pages.
Partial English Translation and Abstract of Chinese Patent Application No. CN102790768A, Sep. 16, 2014, 13 pages.
Partial English Translation and Abstract of Chinese Patent Application No. CN103179213A, Sep. 16, 2014, 5 pages.
Partial English Translation and Abstract of Chinese Patent Application No. CN103412746A, Part 1, Sep. 16, 2014, 11 pages.
Partial English Translation and Abstract of Chinese Patent Application No. CN103412746A, Part 2, Sep. 16, 2014, 2 pages.
Foreign Communication From a Counterpart Application, PCT Application No. PCT/CN2014/072478, International Search Report dated May 28, 2014, 7 pages.
Foreign Communication From a Counterpart Application, PCT Application No. PCT/CN2014/072478, Written Opinion dated May 28, 2014, 6 pages.
Foreign Communication From a Counterpart Application, Korean Application No. 10-2014-7026984, Korean Office Action dated Sep. 18, 2015, 5 pages.
Foreign Communication From a Counterpart Application, Korean Application No. 10-2014-7026984, English Translation of Korean Office Action dated Sep. 18, 2015, 3 pages.

* cited by examiner

METHOD FOR SHARING MEDIA CONTENT, TERMINAL DEVICE, AND CONTENT SHARING SYSTEM

CROSS-REFERENCE TO RELATED APPLICATIONS

This application is a continuation of International Application No. PCT/CN2014/072478, filed on Feb. 25, 2014, which claims priority to Chinese Patent Application No. 201310311058.3, filed on Jul. 23, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of computer technologies, and in particular, to a method for sharing media content, a terminal device, and a content sharing system.

BACKGROUND

Currently, various services based on social networking services (SNS) have already become major tools for a user to propagate content.

A user can publish media content such as a photo, a video, and music by using, for example, a microblog. The microblog publishes content besides texts, including content on a local terminal, or can publish a uniform/universal resource locator (URL) of a third party website, and other people can browse the published content by using this URL address. If the user publishes a video, the video basically cannot be published due to limitation of such conditions as an uploading bandwidth and a background service. Only some SNS accounts with a special right can publish video content.

Currently, there are many similar applications related to video-based or Over The Top (OTT) video (referring to a video service based on the open Internet)-based interactions on the Internet, though some interactions are an interaction manner different from an SNS interaction instead of interactions based on a real SNS service. For example, according to a piece of OTT video content or in an online OTT content live broadcasting room, a user can express an opinion based on content, and can communicate with other users who are watching the content simultaneously.

In some existing applications, for example, when a user watches a television program or a piece of OTT video content on a television, the user can discover, by using an SNS client installed on a terminal device or a personal computer, some persons who are watching the same program simultaneously, and can discuss and share program content. By using the client, the user may also search for some desired content or what content related persons are watching; or, the client may also interconnect with another SNS client, for example, a microblog; and the user may publish, by using the client, related program information or comments on the microblog.

However, in the prior art, the user only establishes a "community" based on existing content to achieve a purpose of communication and sharing, and the user has a relatively low participation in the content, which limits user interactivity and flexibility of content sharing to a certain degree.

SUMMARY

Embodiments of the present invention provide a method for sharing media content, a terminal device, and a content sharing system, which are used to enhance flexibility of content sharing and user interactivity in a social networking services scenario.

To solve the foregoing technical problem, the embodiments of the present invention provide the following technical solutions:

A first aspect of the present invention provides a method for sharing media content, which may include: if detecting that N second terminal devices are playing M pieces of media content online, obtaining, by a first terminal device, M network addresses from the N second terminal devices, where the M network addresses correspond one to one to the M pieces of media content, M is greater than or equal to N, and N and M are positive integers; obtaining, based on the M network addresses, the M pieces of media content from a content server, editing the M pieces of media content obtained from the content server, to obtain first media content, generating editing information according to an editing manner used when the first media content is obtained, and sending the editing information to the content server; receiving a second network address sent by the content server, where the second network address is a network address corresponding to a first media content playlist which is generated by the content server based on the editing information, where the first media content playlist is a media content playlist corresponding to the first media content; and publishing the second network address on a social networking server.

With reference to the first aspect, in a first possible implementation manner, if detecting that N second terminal devices are playing M pieces of media content online, the obtaining, by a first terminal device, M network addresses from the N second terminal devices includes: if detecting, based on the Service Discovery Protocol, that N second terminal devices are playing M pieces of media content online, obtaining, by the first terminal device, M network addresses from the N second terminal devices.

With reference to the first aspect or the first possible implementation manner of the first aspect, in a second possible implementation manner, if detecting, based on the Service Discovery Protocol, that N second terminal devices are playing M pieces of media content online, the obtaining M network addresses from the N second terminal devices includes: after the first terminal device logs on to the social networking server, if detecting, based on the Service Discovery Protocol, that N second terminal devices are playing M pieces of media content online, obtaining M network addresses from the N second terminal devices.

With reference to the first aspect or the first possible implementation manner of the first aspect or the second possible implementation manner of the first aspect, in a third possible implementation manner, the editing the M pieces of media content obtained from the content server, to obtain first media content includes: cutting and/or typesetting a part or all of content fragments included in the M pieces of media content obtained from the content server, to obtain the first media content.

With reference to the first aspect or the first possible implementation manner of the first aspect or the second possible implementation manner of the first aspect, in a fourth possible implementation manner, the editing the M pieces of media content obtained from the content server, to obtain first media content includes: typesetting a part or all of content fragments included in the M pieces of media content obtained from the content server, and inserting second media content into the content fragments to obtain the first media content; and the method further includes: sending, by the first terminal device, the inserted second media content to the content server, so that the content server synthesizes the first media content according to the editing information, the M pieces of media content, and the second media content.

A second aspect of the present invention provides a terminal device, which may include: a detecting and obtaining unit configured to: if detecting that N second terminal devices are playing M pieces of media content online, obtain M network addresses from the N second terminal devices, where the M network addresses correspond one to one to the M pieces of media content, M is greater than or equal to N, and N and M are positive integers; a content obtaining unit configured to obtain, based on the M network addresses, the M pieces of media content from a content server; an editing unit configured to edit the M pieces of media content obtained from the content server, to obtain first media content, and generate editing information according to an editing manner used when the first media content is obtained; a reporting unit configured to send the editing information to the content server; a receiving unit configured to receive a second network address sent by the content server, where the second network address is a network address corresponding to a first media content playlist which is generated by the content server based on the editing information, where the first media content playlist is a media content playlist corresponding to the first media content; and a publishing unit configured to publish the second network address on a social networking server.

With reference to the second aspect, in a first possible implementation manner, the detecting and obtaining unit is specifically configured to: after the terminal device logs on to the social networking server, if detecting, based on the Service Discovery Protocol, that N second terminal devices are playing M pieces of media content online, obtain M network addresses from the N second terminal devices, where the M network addresses correspond one to one to the M pieces of media content, M is greater than or equal to N, and N and M are positive integers.

With reference to the second aspect or the first possible implementation manner of the second aspect, in a second possible implementation manner, the editing unit is specifically configured to: cut and/or typeset a part or all of content fragments included in the M pieces of media content obtained from the content server, to obtain the first media content, and generate the editing information according to an editing manner used when the first media content is obtained.

With reference to the second aspect or the first possible implementation manner of the second aspect, in a third possible implementation manner, the editing unit is specifically configured to: typeset a part or all of content fragments included in the M pieces of media content obtained from the content server, and insert second media content into the content fragments to obtain the first media content, and generate the editing information according to an editing manner used when the first media content is obtained; and the reporting unit is further configured to send the inserted second media content to the content server, so that the content server synthesizes the first media content according to the editing information, the M pieces of media content, and the second media content.

A third aspect of the present invention provides a content sharing system, which may include: a first terminal device, N second terminal devices, a content server, and a social networking server, where: the first terminal device is configured to: if detecting that the N second terminal devices are playing M pieces of media content online, obtain M network addresses from the N second terminal devices, where the M network addresses correspond one to one to the M pieces of media content, M is greater than or equal to N, and N and M are positive integers; obtain, based on the M network addresses, the M pieces of media content from the content server, edit the M pieces of media content obtained from the content server, to obtain first media content, and generate editing information according to an editing manner used when the first media content is obtained; send the editing information to the content server; receive a second network address sent by the content server, where the second network address is a network address corresponding to a first media content playlist which is generated by the content server based on the editing information, where the first media content playlist is a media content playlist corresponding to the first media content; and publish the second network address on a social networking server.

It may be seen from the above that in the solutions of the embodiments of the present invention, if detecting that N second terminal devices are playing M pieces of media content online, a first terminal device obtains M network addresses from the N second terminal devices; the first terminal device obtains, based on the M network addresses, M pieces of media content from a content server, edits the M pieces of media content obtained from the content server, to obtain first media content, and generates editing information according to an editing manner used when the first media content is obtained; the first terminal device sends the editing information to the content server, and receives a second network address sent by the content server; and the first terminal device publishes the second network address on a social networking server. Because an inter-device media content sharing mechanism is introduced, the first terminal device can edit, according to a user personalized requirement, media content that is being played by another device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

Figure 1:
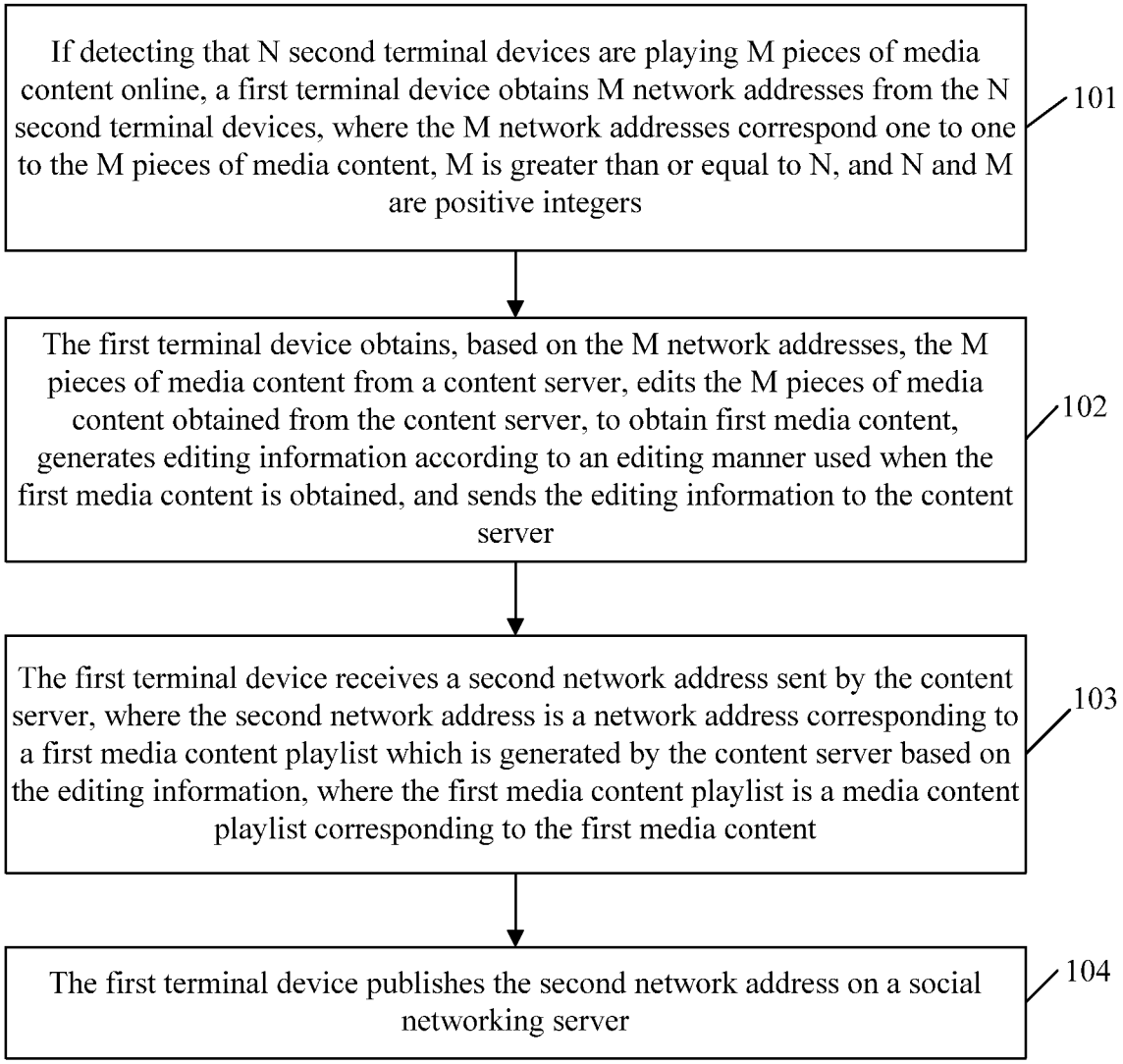
FIG. 1 is a schematic flowchart of a method for sharing media content according to an embodiment of the present invention.

Embodiments of the present invention provide a method for sharing media content, a terminal device, and a content sharing system, which are used to enhance flexibility of content sharing and user interactivity in a social networking services scenario.

To make the objectives, technical solutions, and advantages of the present invention clearer, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

The following describes the present invention in detail.

Terms such as "first", "second", "third", "fourth" (if existing) in the specification, the claims, and the foregoing accompanying drawings are used to differentiate similar objects but are not necessarily used to describe a specific sequence or order. It should be understood that data used in such way may be exchanged in a proper case, so that the embodiments of the present invention described herein, for example, can be implemented in a sequence besides the sequences shown in the figures or described herein. In addition, terms "include" and "have" and any modification thereof are intended to cover inclusion without exclusion, for example, a process, a method or a system, a product or a device that includes a series of steps or units does not need to list these steps or units clearly, but can include other steps or units that are not listed clearly or are inherent for the process, the method, the product or the device.

In an embodiment of a method for sharing media content provided in the present invention, the method for sharing media content may include: if detecting that N second terminal devices are playing M pieces of media content online, obtaining, by a first terminal device, M network addresses from the N second terminal devices, where the M network addresses correspond one to one to the M pieces of media content, M is greater than or equal to N, and N and M are positive integers; obtaining, based on the M network addresses, the M pieces of media content from a content server, editing the M pieces of media content obtained from the content server, to obtain first media content, and generating editing information according to an editing manner used when the first media content is obtained; sending the editing information to the content server; receiving a second network address sent by the content server, where the second network address is a network address corresponding to a first media content playlist which is generated by the content server based on the editing information, where the first media content playlist is a media content playlist corresponding to the first media content; and publishing the second network address on a social networking server.

First, referring to FIG. 1, FIG. 1 is a schematic flowchart of a method for sharing media content according to an embodiment of the present invention. As shown in FIG. 1, a method for sharing media content provided in an embodiment of the present invention may include the following content:

101: If detecting that N second terminal devices are playing M pieces of media content online, a first terminal device obtains M network addresses from the N second terminal devices, where the M network addresses correspond one to one to the M pieces of media content, M is greater than or equal to N, and N and M are positive integers.

The terminal device (for example, the first terminal device) may be a mobile phone, a personal digital assistant, a notebook computer or another type of terminal device that can be used to log on to a social networking server. The second terminal device may be a mobile phone, a personal digital assistant, a notebook computer, a network television terminal, a digital television terminal, an intelligent television, an OTT streaming player or another type of terminal device that can be used to play media content online.

In some embodiments of the present invention, the first terminal device and the N second terminal devices may be located on a same local area network, and the first terminal device may discover the N second terminal devices based on the Device Discovery Protocol or another mechanism. The first terminal device may detect and discover, based on the Service Discovery Protocol or another mechanism, that the N second terminal devices are playing the M pieces of media content online. The first terminal device may discover, based on the Service Discovery Protocol, whether the second terminal devices are running various set programs currently.

In some embodiments of the present invention, after the first terminal device logs on to the social networking server or at another time (for example, after the first terminal device is powered on or after the first terminal device discovers the N second terminal devices based on the Device Discovery Protocol), if detecting, based on the Service Discovery Protocol, that N second terminal devices are playing M pieces of media content online, the first terminal device may obtain M network addresses from the N second terminal devices.

In some embodiments of the present invention, the first terminal device may be different from any one terminal device of the N second terminal devices. In a special scenario, the first terminal device may also be one terminal device of the N second terminal devices. The foregoing N may be equal to 1, 2, 3 or another positive integer.

The media content (for example, the M pieces of media content) mentioned in each embodiment of the present invention may refer to audio, a video or other media content.

102: The first terminal device obtains, based on the M network addresses, the M pieces of media content from a content server, edits the M pieces of media content obtained from the content server, to obtain first media content, generates editing information according to an editing manner used when the first media content is obtained, and sends the editing information to the content server.

In some embodiments of the present invention, the first terminal device may edit, according to various needed manners, the M pieces of media content obtained from the content server, to obtain the first media content. For example, the first terminal device may perform a plurality of editing operations such as cutting, typesetting and/or inserting new content (for example, inserting a picture, a text, a speech and/or a video clip) on a part or all of content fragments in the M pieces of media content obtained from the content server, to obtain the first media content. The editing information generated according to the editing manner used when the first media content is obtained may be used to indicate various editing manners used when the first media content is obtained. Therefore, in a scenario in which no new content is inserted during the editing, the content server or another device may also obtain the first media content according to the editing information and the M pieces of media content. In a scenario in which new content is inserted during the editing, the content server or another device may also obtain the first media content according to the editing information, the inserted new content, and the M pieces of media content.

For example, the editing M pieces of media content obtained from the content server, to obtain first media content may include: cutting and/or typesetting a part or all of content fragments (one content fragment may be of 10 seconds, one second or another length) included in the M pieces of media content obtained from the content server, to obtain the first media content.

For another example, the editing the M pieces of media content obtained from the content server, to obtain first media content may include: typesetting a part or all of content fragments included in the M pieces of media content obtained from the content server, and inserting second media content into the content fragments to obtain the first media content. In this scenario, the method for sharing media content may further include: sending, by the first terminal device, the inserted second media content to the content server, so that the content server synthesizes the first media content according to the editing information, the M pieces of media content, and the second media content.

103: The first terminal device receives a second network address sent by the content server, where the second network address is a network address corresponding to a first media content playlist which is generated by the content server based on the editing information, where the first media content playlist is a media content playlist corresponding to the first media content.

104: The first terminal device publishes the second network address on the social networking server.

After the first terminal device publishes the second network address on the social networking server, other users logging on to the social networking server may watch, based on the second network address, the first media content edited by the first terminal device. Certainly, due to a difference between capabilities of terminal devices, the first media content watched by different users may be different in terms of resolution and bit rate.

It may be seen from the above description that in this embodiment, if detecting that N second terminal devices are playing M pieces of media content online, a first terminal device obtains M network addresses from the N second terminal devices; the first terminal device obtains, based on the M network addresses, the M pieces of media content from a content server, edits the M pieces of media content obtained from the content server, to obtain first media content, and generates editing information according to an editing manner used when the first media content is obtained; the first terminal device sends the editing information to the content server, and receives a second network address sent by the content server; and the first terminal device publishes the second network address on a social networking server. Because an inter-device media content sharing mechanism is introduced, the first terminal device can edit, according to a user personalized requirement, media content that is being played by another device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

For the convenience of better understanding and implementation of the foregoing solution of the embodiments of the present invention, the following describes the solution by using some specific application scenarios as examples.

Figure 2:
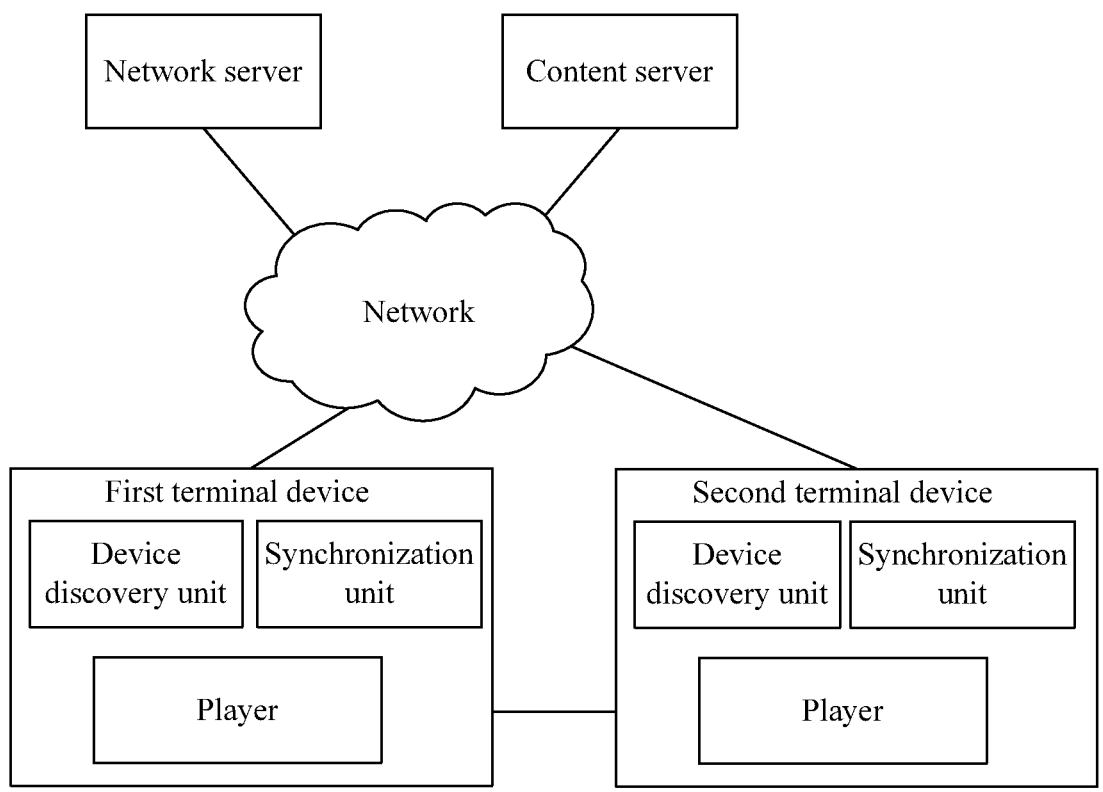
FIG. 2 is a schematic diagram of a network architecture according to an embodiment of the present invention.

Scenario 1: A scenario in which OTT content is played. Referring to FIG. 2, FIG. 2 is a system architecture diagram in scenario 1. Certainly, a playing scenario of other media content may be deduced by analogy.

A network side includes a social networking server (for example, a microblog server) and a content server (for example, a video source server, specifically, for example, an OTT server, or the like).

A terminal side may include a first terminal device (the first terminal device is, for example, a personal computer, a mobile phone, a personal digital processing device or another type of terminal device that can be used to log on to the social networking server) and a second terminal device (the second terminal device may be, for example, a network television terminal, an OTT streaming player (for example, a dongle player), a digital television terminal, an intelligent television or another type of terminal device that can be used to play media content online).

In some embodiments of the present invention, the first terminal device and the second terminal device may include the following functional units: a device discovery unit (Device Discovery), which can be configured to discover other devices on a same local area network (for example, a home area network) based on the Device Discovery Protocol; a media player, which can be configured to obtain a video playing state and video source information; and a synchronization unit (Msg Bus), which can be configured to synchronize information between devices on a same local area network.

In some embodiments of the present invention, a user may log on to an SNS server by using an SNS client deployed in the first terminal device, so as to publish information to the SNS server. Assuming that both the first terminal device and the second terminal device access a home area network, the first terminal device may discover the second terminal device based on the Device Discovery Protocol, for example, the first terminal device discovers, based on the Service Discovery Protocol, that an OTT player deployed in the second terminal device is playing media content X (such as, a video of The Voice of China Final or a video of the NBA® Final) in which the user is interested online; the first terminal device first obtains, from the second terminal device, a network address WN1 (for example, a uniform resource locator) corresponding to the media content X, and then the first terminal device may obtain, based on the network address WN1, the media content X from the content server; the user edits the media content X by using the first terminal device, to obtain media content Y (where the media content Y is similar to the first media content mentioned in the foregoing embodiment), and the first terminal device may generate editing information based on an editing manner (for example, Wu Mochou's early photos and photos during the contest may be inserted into the video of The Voice of China Final, special effect music and/or graffito is inserted into a video segment of Wu Mochou's appearance, and even a part of video segments of candidates in which the user is uninterested in the Final may be deleted) used when the media content Y is obtained, and report the editing information to the content server (if new content is inserted, the inserted content is further reported to the content server); the content server may generate a first media content playlist based on the editing information, where the first media content playlist is a media content playlist corresponding to the first media content; the content server further allocates a network address WN2 to the first media content playlist, and sends the network address WN2 to the first terminal device, while the first terminal device may publish the network address WN2 on a social networking server. After the first terminal device publishes the network address WN2 on the social networking server, other users logging on to the social networking server may watch, based on the network address WN2, the media content Y edited by the first terminal device. Certainly, due to a difference between capabilities of terminal devices, the media content Y watched by different users may be different in terms of resolution and bit rate, but the substantial content is the same.

The following description is given with reference to flowcharts.

Figure 3:
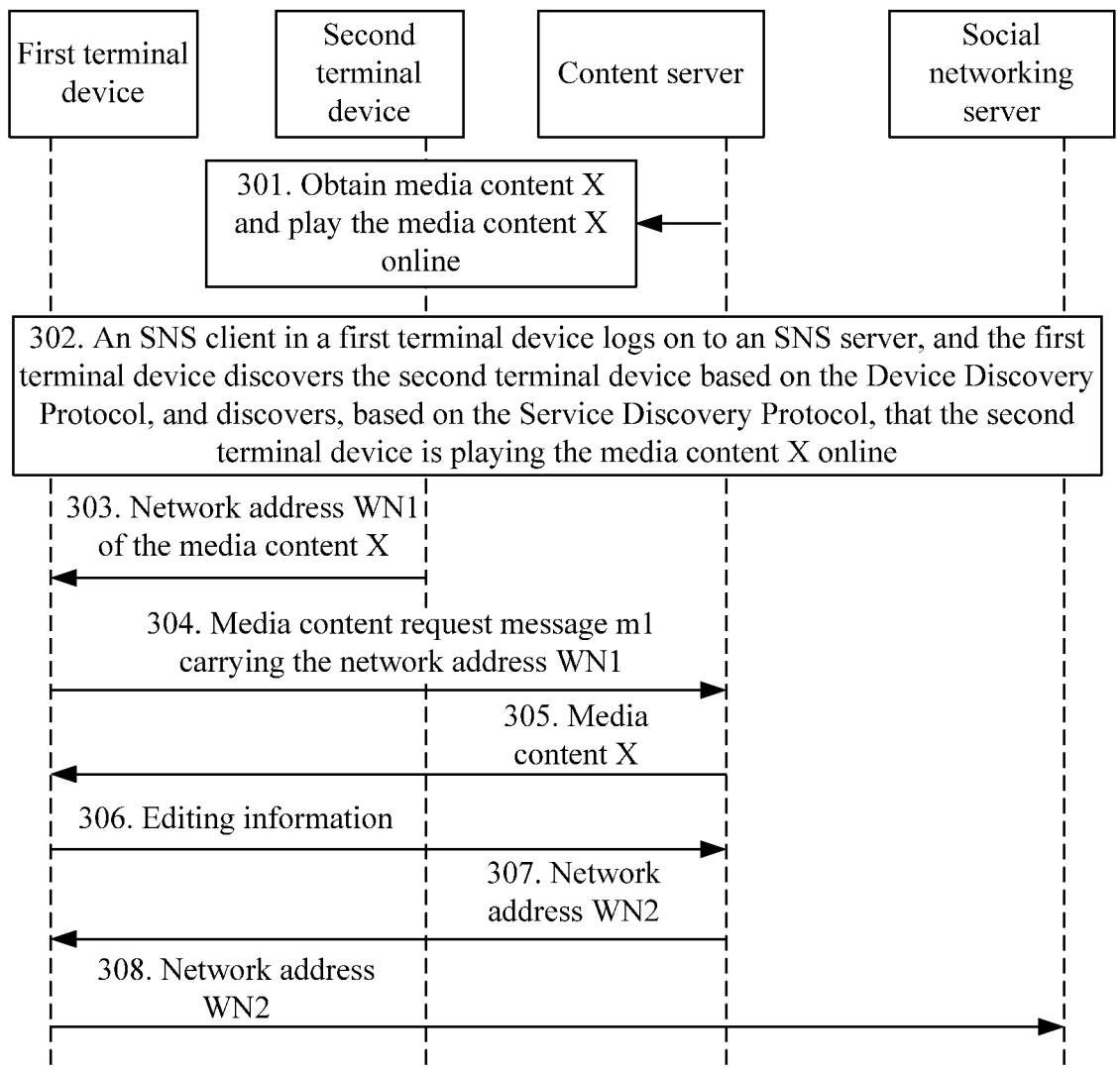
FIG. 3 is a schematic flowchart of another method for sharing media content according to an embodiment of the present invention.

First, referring to FIG. 3, FIG. 3 is a schematic flowchart of another method for sharing media content according to another embodiment of the present invention. As shown in FIG. 3, another method for sharing media content provided in another embodiment of the present invention may include the following content:

301: A second terminal device obtains media content X from a content server, and plays the media content X online.

302: An SNS client in a first terminal device logs on to an SNS server, and the first terminal device discovers the second terminal device based on the Device Discovery Protocol, and discovers, based on the Service Discovery Protocol, that the second terminal device is playing the media content X online.

303: The first terminal device obtains a network address WN1 of the media content X from the second terminal device.

Certainly, the first terminal device may further obtain, from the second terminal device, break point information s1 that the second terminal device plays the media content X, where the break point information s1 may indicate a time position at which the second terminal device plays the media content X currently.

304: The first terminal device sends a media content request message m1 carrying the network address WN1 to the content server.

In some embodiments of the present invention, if the first terminal device obtains the break point information s1, the media content request message m1 may further carry the break point information s1. In addition, the media content request message m1 may further carry capability information of the first terminal device, and the like.

305: After receiving the media content request message m1, the content server may push the media content X corresponding to the network address WN1 to the first terminal device.

If the media content request message m1 carries the break point information s1, the media content X pushed by the content server to the first terminal device may be a content part from the time position indicated by the break point information s1 to an end position, where the time position and the end position are in the complete media content X.

If the media content request message m1 carries the capability information of the first terminal device, the content server pushes the media content X meeting the capability of the first terminal device to the first terminal device. Certainly, due to a difference between capabilities of terminal devices, the media content X obtained from the content server by the first terminal device and the second terminal device may be the same or different in terms of parameters such as resolution and bit rate.

306: The first terminal device edits the media content X obtained from the content server, to obtain media content Y, generates editing information according to an editing manner used when the media content Y is obtained, and sends the editing information to the content server.

In some embodiments of the present invention, the first terminal device may edit, according to various needed manners, the media content X obtained from the content server, to obtain the media content Y. For example, the first terminal device may perform a plurality of editing operations such as cutting, typesetting and/or inserting new content (for example, inserting a picture, a text, a speech and/or a video clip) on a part or all of content fragments in the media content X obtained from the content server, to obtain the media content Y. The editing information generated according to the editing manner used when the media content Y is obtained may be used to indicate various editing manners used when the media content Y is obtained. Therefore, in a scenario in which no new content is inserted during the editing, the content server or another device may also obtain the media content Y according to the editing information and the media content X. In a scenario in which new content is inserted during the editing, the content server or another device may also obtain the media content Y according to the editing information, the inserted new content, and the media content X.

For example, the editing the media content X obtained from the content server, to obtain the media content Y may include: cutting and/or typesetting a part or all of content fragments (one content fragment may be of 10 seconds, one second or another length) included in the media content X obtained from the content server, to obtain the media content Y.

For another example, the editing the media content X obtained from the content server, to obtain the media content Y may include: typesetting a part or all of content fragments included in the media content X obtained from the content server, and inserting second media content into the content fragments to obtain the media content Y. In this scenario, the first terminal device further sends the inserted second media content to the content server, so that the content server synthesizes the media content Y according to the editing information, the media content X, and the second media content.

307: The content server generates a first media content playlist based on the editing information, and allocates a network address WN2 to the first media content playlist, where the first media content playlist is a media content playlist corresponding to the media content Y.

The content server sends the network address WN2 to the first terminal device.

308: The first terminal device receives the network address WN2 sent by the content server, and publishes the network address WN2 on a social networking server.

After the first terminal device publishes the network address WN2 on the social networking server, other users logging on to the social networking server may watch, based on the network address WN2, the media content Y edited by the first terminal device. Certainly, due to a difference between capabilities of terminal devices, the media content Y watched by different users may be different in terms of resolution and bit rate.

It may be seen that in the foregoing scenario, after a first terminal device logs on to the SNS server, if detecting that a second terminal device is playing one piece of media content online, the first terminal device obtains a network address of the one piece of media content from the second terminal device; the first terminal device obtains, based on the network address, the media content from a content server, edits the media content obtained from the content server, to obtain media content Y, and generates editing information according to an editing manner used when the media content Y is obtained; the first terminal device sends the editing information to the content server, and receives a network address WN2 sent by the content server; and the first terminal device publishes the network address WN2 on a social networking server. Because an inter-device media content sharing mechanism is introduced, the first terminal device can edit, according to a user personalized requirement, media content that is being played by the second terminal device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

Scenario 1 is introduced mainly by using an example that an inter-device content sharing mechanism is implemented between two devices (that is, a first terminal device and a second terminal device). Certainly, the first terminal device and the second terminal device may be combined into one device, that is, the terminal device is not only deployed with an SNS client, but also can play media content online. The following scenario 2 is an application scenario in which the first terminal device and the second terminal device may be combined into one device.

Scenario 2

Figure 4:
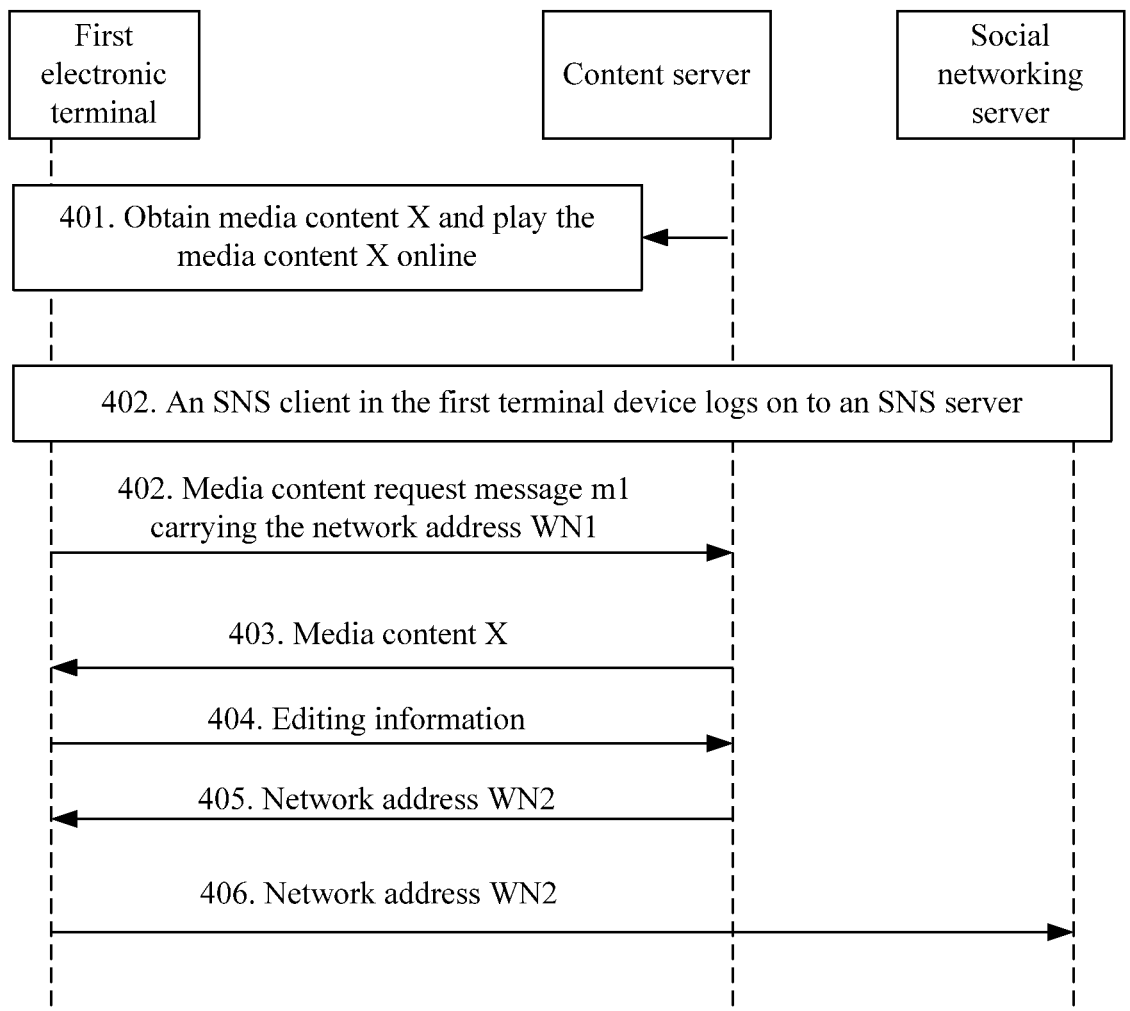
FIG. 4 is a schematic flowchart of another method for sharing media content according to an embodiment of the present invention.

Referring to FIG. 4, FIG. 4 is a schematic flowchart of another method for sharing media content according to another embodiment of the present invention. As shown in FIG. 4, another method for sharing media content provided in another embodiment of the present invention may include the following content:

401: A first terminal device obtains media content X from a content server, and plays the media content X online.

402: After an SNS client in the first terminal device logs on to an SNS server, the first terminal device sends a media content request message m1 carrying a network address WN1 to the content server.

The network address WN1 is a network address of the media content X.

In addition, in some embodiments of the present invention, the media content request message m1 may further carry break point information s1, where the break point information s1 may indicate a time position at which the first terminal device plays the media content X currently.

403: After receiving the media content request message m1, the content server may push the media content X corresponding to the network address WN1 to the first terminal device.

If the media content request message m1 carries the break point information s1, the media content X pushed by the content server to the first terminal device may be a content part from the time position indicated by the break point information s1 to an end position, where the time position and the end position are in the complete media content X.

404: The first terminal device edits the media content X obtained from the content server, to obtain media content Y, generates editing information according to an editing manner used when the media content Y is obtained, and sends the editing information to the content server.

In some embodiments of the present invention, the first terminal device may edit, according to various needed manners, the media content X obtained from the content server, to obtain the media content Y. For example, the first terminal device may perform a plurality of editing operations such as cutting, typesetting and/or inserting new content (for example, inserting a picture, a text, a speech and/or a video clip) on a part or all of content fragments in the media content X obtained from the content server, to obtain the media content Y. The editing information generated according to the editing manner used when the media content Y is obtained may be used to indicate various editing manners used when the media content Y is obtained. Therefore, in a scenario in which no new content is inserted during the editing, the content server or another device may also obtain the media content Y according to the editing information and the media content X. In a scenario in which new content is inserted during the editing, the content server or another device may also obtain the media content Y according to the editing information, the inserted new content, and the media content X.

For example, the editing the media content X obtained from the content server, to obtain the media content Y may include: cutting and/or typesetting a part or all of content fragments (one content fragment may be of 10 seconds, one second or another length) included in the media content X obtained from the content server, to obtain the media content Y.

For another example, the editing the media content X obtained from the content server, to obtain the media content Y may include: typesetting a part or all of content fragments included in the media content X obtained from the content server, and inserting second media content into the content fragments to obtain the media content Y. In this scenario, the first terminal device further sends the inserted second media content to the content server, so that the content server synthesizes the media content Y according to the editing information, the media content X, and the second media content.

405: The content server generates a first media content playlist based on the editing information, and allocates a network address WN2 to the first media content playlist, where the first media content playlist is a media content playlist (playlist) corresponding to the media content Y.

The content server sends the network address WN2 to the first terminal device.

406: The first terminal device receives the network address WN2 sent by the content server, and publishes the network address WN2 on a social networking server.

After the first terminal device publishes the network address WN2 on the social networking server, other users logging on to the social networking server may watch, based on the network address WN2, the media content Y edited by the first terminal device. Certainly, due to a difference between capabilities of terminal devices, the media content Y watched by different users may be different in terms of resolution and bit rate.

It may be seen that in the foregoing scenario, after a first terminal device logs on to an SNS server, the first terminal device may obtain, from a content server, one piece of media content that is being played by the first terminal device, edit the media content obtained from the content server, to obtain the media content Y, generate editing information according to an editing manner used when the media content Y is obtained; the first terminal device sends the editing information to the content server, and receives a network address WN2 sent by the content server; and the first terminal device publishes the network address WN2 on a social networking server. Because a mechanism that media content being played online may be shared after the media content is edited, the first terminal device can edit, according to a user personalized requirement, the media content that is being played, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

Scenario 3

On a home area network in scenario 3, there may be a plurality of devices (specific functions are not further described) of which attributes are similar to the second terminal device, for example, there are two second terminal devices on the home area network (it may be deduced by analogy in a scenario in which there are more second terminal devices). A first terminal device may obtain, according to the similar manner described in scenario 1 and from the two second terminal devices, a network address of media content that is being played online by the two second terminal devices respectively, and obtain multiple pieces of media content from a content server by using the network address; the first terminal device edits the multiple pieces of media content obtained from the content server, to obtain one piece of new media content, generates editing information corresponding to an editing manner used when the one piece of new media content is obtained, and reports the editing information to the content server; the content server may generate a first media content playlist based on the editing information, where the first media content playlist is a media content playlist corresponding to the new media content; the content server allocates a network address WN2 to the first media content playlist, and sends the network address WN2 to the first terminal device; and the first terminal device may publish the network address WN2 on a social networking server. After the first terminal device publishes the network address WN2 on the social networking server, other users logging on to the social networking server may watch, based on the network address WN2, the new media content edited by the first terminal device. Certainly, due to a difference between capabilities of terminal devices, the new media content watched by different users may be different in terms of resolution and bit rate, but the substantial content is the same.

The foregoing several scenarios are mainly provided for editing and sharing of OTT content, and relate to a content sharing mechanism crossing one device, crossing multiple devices, and on a single device. The manners of obtaining OTT content streams are different in the foregoing several scenarios, and finally the first terminal device publishes a network address corresponding to the OTT content which is edited and synthesized by the first terminal device.

In some other application scenarios of the present invention, the OTT content may be integrated with local media content, and the first terminal device may embed other local content into one piece of media content edited by the first terminal device, for example, it embeds a local picture or a local video segment into an OTT online video. In this case, the first terminal device uploads the inserted new content and the editing information to a content server (for example, an OTT Server); the content server synthesizes new media content according to the new content and the editing information, generates a playlist and a URL that correspond to the synthesized new media content, and pushes the URL to the first terminal device; and an SNS client in the first terminal device publishes the URL on the SNS Server.

In some other application scenarios, after obtaining one or more pieces of OTT content (from another device or from the OTT Server), the first terminal device may capture, from pictures of the one or more pieces of video content, a picture of content in which a user is interested in, and capture multiple pictures from multiple pieces of OTT content. In addition, the first terminal device may combine these pictures in any manner. Then, the SNS client of the first terminal device may publish the combined picture on the SNS Server.

In some other application scenarios of the present invention, terminal devices on the home area network may discover each other based on the Device Discovery Protocol; after a first terminal device deployed with an SNS client logs on to an SNS server, the first terminal device may request a second terminal device to capture k pictures from content currently played by the second terminal device; the second terminal device sends the k pictures to the first terminal device, and the SNS client in the first terminal device may publish the k pictures on the SNS Server, or, the first terminal device may insert the k pictures into a piece of local content to obtain new media content, and the first terminal device may upload the obtained new media content to a content server (for example, an OTT Server); the content server generates a playlist and a URL that correspond to the synthesized new media content, and pushes the URL to the first terminal device; and the SNS client in the first terminal device publishes the URL on the SNS Server. Alternatively, the first terminal device may insert the k pictures into a piece of local content to obtain new media content, and the SNS client in the first terminal device publishes the new media content on the SNS Server.

In the solution of the embodiment of the present invention, for media content that can be played online such as OTT, a user may edit and synthesize the media content, which increases user participation in third party content. In addition, the media content is organically combined with an SNS, which facilitates content sharing, accelerates a sharing speed, and also extends a content spreading range of the SNS. The user may obtain multiple OTT online video sources, and edit and stitch the multiple online video sources, thereby featuring a great flexibility; after obtaining OTT content from other devices, an SNS terminal may take a photo at a node of a video, and publishes the photo; and an SNS device obtains, from another device, not only content of a browsed video but also a browsed photo, thereby featuring a rich scenario.

Figure 5:
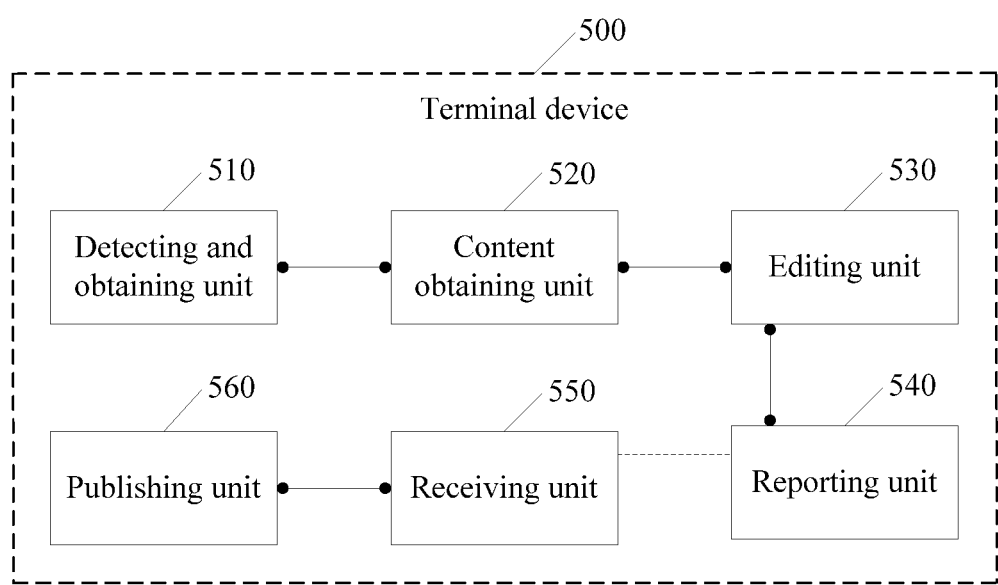
FIG. 5 is a schematic diagram of a terminal device according to an embodiment of the present invention.

Referring to FIG. 5, an embodiment of the present invention further provides a terminal device 500, which may include: a detecting and obtaining unit 510, a content obtaining unit 520, an editing unit 530, a reporting unit 540, a receiving unit 550, and a publishing unit 560.

The detecting and obtaining unit 510 is configured to: if detecting that N second terminal devices are playing M pieces of media content online, obtain M network addresses from the N second terminal devices, where the M network addresses correspond one to one to the M pieces of media content, M is greater than or equal to N, and N and M are positive integers.

The content obtaining unit 520 is configured to obtain, based on the M network addresses, the M pieces of media content from a content server.

The editing unit 530 is configured to edit the M pieces of media content obtained from the content server, to obtain first media content, and generate editing information according to an editing manner used when the first media content is obtained.

The reporting unit 540 is configured to send the editing information to the content server.

The receiving unit 550 is configured to receive a second network address sent by the content server, where the second network address is a network address corresponding to a first media content playlist which is generated by the content server based on the editing information, where the first media content playlist is a media content playlist corresponding to the first media content.

The publishing unit 560 is configured to publish the second network address on a social networking server.

In some application scenarios of the present invention, the detecting and obtaining unit 510 may be specifically configured to: after the terminal device 500 logs on to the social networking server, if detecting, based on the Service Discovery Protocol, that N second terminal devices are playing M pieces of media content online, obtain M network addresses from the N second terminal devices, where the M network addresses correspond one to one to the M pieces of media content, M is greater than or equal to N, and N and M are positive integers.

In some application scenarios of the present invention, the editing unit 530 may be specifically configured to cut and/or typeset a part or all of content fragments included in the M pieces of media content obtained from the content server, to obtain the first media content, and generate the editing information according to an editing manner used when the first media content is obtained.

In some application scenarios of the present invention, the editing unit 530 may be specifically configured to typeset a part or all of content fragments included in the M pieces of media content obtained from the content server, and insert second media content into the content fragments to obtain the first media content, and generate the editing information according to an editing manner used when the first media content is obtained.

The reporting unit 540 is further configured to send the inserted second media content to the content server, so that the content server synthesizes the first media content according to the editing information, the M pieces of media content, and the second media content.

It may be understood that functions of each functional module of the terminal device 500 in this embodiment may be specifically implemented according to the method in the foregoing method embodiments. For details about the specific implementation process, reference may be made to the related descriptions of the foregoing method embodiments, which is not further described herein.

It may be seen from the above description that in this embodiment, if detecting that N second terminal devices are playing M pieces of media content online, a terminal device 500 obtains M network addresses from the N second terminal devices; the terminal device 500 obtains, based on the M network addresses, the M pieces of media content from a content server, edits the M pieces of media content obtained from the content server, to obtain first media content, and generates editing information according to an editing manner used when the first media content is obtained; the terminal device 500 sends the editing information to the content server, and receives a second network address sent by the content server; and the terminal device 500 publishes the second network address on a social networking server. Because an inter-device media content sharing mechanism is introduced, the terminal device 500 can edit, according to a user personalized requirement, media content that is being played by another device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

Figure 6:
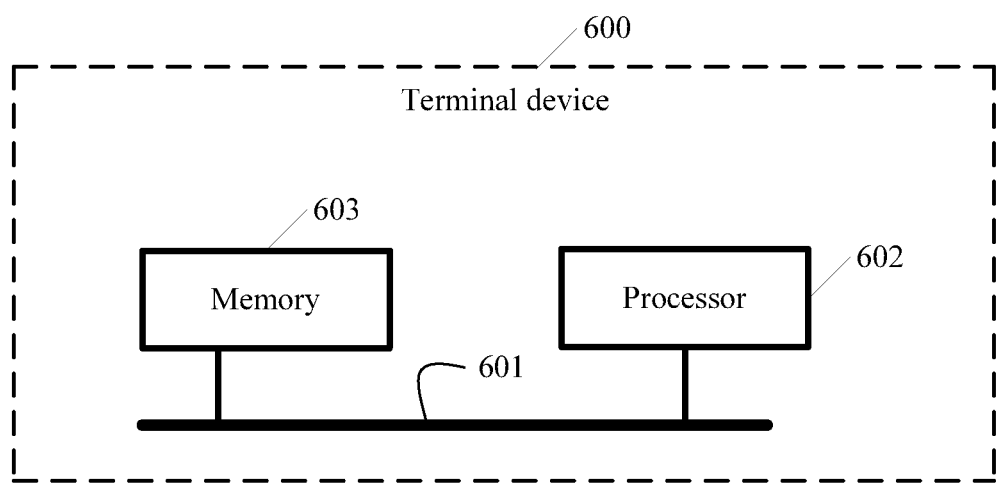
FIG. 6 is a schematic diagram of another terminal device according to an embodiment of the present invention.

FIG. 6 is a schematic structural diagram of a terminal device 600 according to the present invention. As shown in FIG. 6, the terminal device provided in this embodiment includes: at least one bus 601, at least one processor 602 connected to the bus 601, and at least one memory 603 connected to the bus 601.

The processor 602 calls, through the bus 601, code stored in the memory 603 to: if detecting that N second terminal devices are playing M pieces of media content online, obtain M network addresses from the N second terminal devices, where the M network addresses correspond one to one to the M pieces of media content, M is greater than or equal to N, and N and M are positive integers; obtain, based on the M network addresses, the M pieces of media content from a content server, edit the M pieces of media content obtained from the content server, to obtain first media content, generate editing information according to an editing manner used when the first media content is obtained; send the editing information to the content server; receive a second network address sent by the content server, where the second network address is a network address corresponding to a first media content playlist which is generated by the content server based on the editing information, where the first media content playlist is a media content playlist corresponding to the first media content; and publish the second network address on a social networking server.

The terminal device 600 may be a mobile phone, a personal digital assistant, a notebook computer or another type of terminal device that can be used to log on to the social networking server. The second terminal device may be, for example, a network television terminal, a digital television terminal, an intelligent television, an OTT streaming player or another type of terminal device that can be used to play media content online.

In some embodiments of the present invention, the terminal device 600 and the N second terminal devices may be located on a same local area network, and the processor 602 may discover the N second terminal devices based on the Device Discovery Protocol or another mechanism. The processor 602 may detect and discover, based on the Service Discovery Protocol or another mechanism, that the N second terminal devices are playing the M pieces of media content online. The processor 602 may discover, based on the Service Discovery Protocol, whether the second terminal devices are running various set programs currently.

In some embodiments of the present invention, after the terminal device 600 logs on to the social networking server or at another time (for example, after the terminal device 600 is powered on or after the processor 602 discovers the N second terminal devices based on the Device Discovery Protocol), if detecting, based on the Service Discovery Protocol, that N second terminal devices are playing M pieces of media content online, the processor 602 may obtain M network addresses from the N second terminal devices.

In some embodiments of the present invention, the terminal device 600 may be different from any one terminal device of the N second terminal devices. In a special scenario, the terminal device 600 may also be one terminal device of the N second terminal devices. The foregoing N may be equal to 1, 2, 3 or another positive integer.

In some embodiments of the present invention, the processor 602 may edit, according to various needed manners, the M pieces of media content obtained from the content server, to obtain first media content. For example, the processor 602 may perform a plurality of editing operations such as cutting, typesetting and/or inserting new content (for example, inserting a picture, a text, a speech and/or a video clip) on a part or all of content fragments in the M pieces of media content obtained from the content server, to obtain the first media content. The editing information generated according to the editing manner used when the first media content is obtained may be used to indicate various editing manners used when the first media content is obtained. Therefore, in a scenario in which no new content is inserted during the editing, the content server or another device may also obtain the first media content according to the editing information and the M pieces of media content. In a scenario in which new content is inserted during the editing, the content server or another device may also obtain the first media content according to the editing information, the inserted new content, and the M pieces of media content.

For example, the editing, by the processor 602, the M pieces of media content obtained from the content server, to obtain first media content may include: cutting and/or typesetting a part or all of content fragments (one content fragment may be of 10 seconds, one second or another length) included in the M pieces of media content obtained from the content server, to obtain the first media content.

For another example, the editing, by the processor 602, the M pieces of media content obtained from the content server, to obtain first media content may include: typesetting a part or all of content fragments included in the M pieces of media content obtained from the content server, and inserting second media content into the content fragments to obtain the first media content. In this scenario, the method for sharing media content may further include: sending, by the terminal device 600, the inserted second media content to the content server, so that the content server synthesizes the first media content according to the editing information, the M pieces of media content, and the second media content.

After the terminal device 600 publishes the second network address on the social networking server, other users logging on to the social networking server may watch, based on the second network address, the first media content edited by the terminal device 600. Certainly, due to a difference between capabilities of terminal devices, the first media content watched by different users may be different in terms of resolution and bit rate.

A computer system provided in this embodiment may be configured to perform a part performed by the first terminal device in the technical solution of any one method embodiment shown in FIG. 1, FIG. 3, or FIG. 4. The implementation principle and the technical effect of the computer system are similar to those of the first terminal device, and are not further described. FIG. 6 is only a schematic structural diagram of a terminal device according to the present invention. The specific structure of the terminal device may be adjusted according to an actual situation.

It may be seen from the above description that in this embodiment, if detecting that N second terminal devices are playing M pieces of media content online, a terminal device 600 obtains M network addresses from the N second terminal devices; the terminal device 600 obtains, based on the M network addresses, the M pieces of media content from a content server, edits the M pieces of media content obtained from the content server, to obtain first media content, and generates editing information according to an editing manner used when the first media content is obtained; the terminal device 600 sends the editing information to the content server, and receives a second network address sent by the content server; and the terminal device 600 publishes the second network address on a social networking server. Because an inter-device media content sharing mechanism is introduced, the terminal device 600 can edit, according to a user personalized requirement, media content that is being played by another device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

Figure 7:
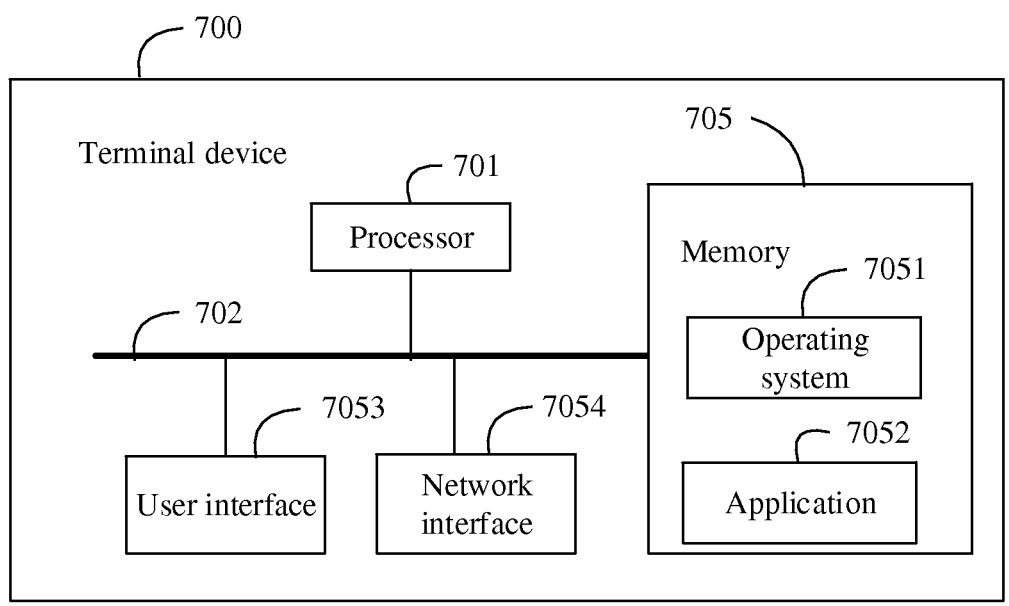
FIG. 7 is a schematic diagram of another terminal device according to an embodiment of the present invention.

FIG. 7 describes a structure of a terminal device 700 according to an embodiment of the present invention. The terminal device 700 includes: at least one processor 701, for example, a central processing unit (CPU), at least one network interface 7054 or another user interface 7053, a memory 705, and at least one communications bus 702. The communications bus 702 is configured to implement connection communication between these components. The terminal device 700 optionally includes the user interface 7053, and includes a display, a keyboard or a clicking device (for example, a mouse, a trackball, a touch panel or a touch display). The memory 705 may include a high speed random access memory (RAM), and may also include a non-volatile memory, for example, at least one magnetic disk memory. The memory 705 may optionally include at least one storage apparatus far away from the processor 701.

In some implementation manners, the memory 705 stores the following elements, an executable module or a data structure, or a subset thereof or an extension set thereof: an operating system 7051, including various system programs and configured to implement various basic services and process hardware-based tasks; and an application module 7052, including various applications and configured to implement various application services.

The application module 7052 includes but is not limited to a detecting and obtaining unit 510, a content obtaining unit 520, an editing unit 530, a reporting unit 540, a receiving unit 550, and a publishing unit 560.

For specific implementation of all modules in the application module 7052, reference may be made to the corresponding modules in the embodiment shown in FIG. 5, which is not further described.

In the embodiment of the present invention, by calling a program or an instruction stored in the memory 705, the processor 701 may be configured to: if detecting that N second terminal devices are playing M pieces of media content online, obtain M network addresses from the N second terminal devices, where the M network addresses correspond one to one to the M pieces of media content, M is greater than or equal to N, and N and M are positive integers; obtain, based on the M network addresses, the M pieces of media content from a content server, edit the M pieces of media content obtained from the content server, to obtain first media content, and generate editing information according to an editing manner used when the first media content is obtained; send the editing information to the content server; receive a second network address sent by the content server, where the second network address is a network address corresponding to a first media content playlist which is generated by the content server based on the editing information, where the first media content playlist is a media content playlist corresponding to the first media content; and publish the second network address on a social networking server.

The terminal device 700 may be a mobile phone, a personal digital assistant, a notebook computer or another type of terminal device that can be used to log on to the social networking server. The second terminal device may be, for example, a network television terminal, a digital television terminal, an intelligent television, an OTT streaming player or another type of terminal device that can be used to play media content online.

In some embodiments of the present invention, the terminal device 700 and the N second terminal devices may be located on a same local area network, and the processor 701 may discover the N second terminal devices based on the Device Discovery Protocol or another mechanism. The processor 701 may detect and discover, based on the Service Discovery Protocol or another mechanism, that the N second terminal devices are playing the M pieces of media content online. The processor 701 may discover, based on the Service Discovery Protocol, whether the second terminal devices are running various set programs currently.

In some embodiments of the present invention, after the terminal device 700 logs on to the social networking server or at another time (for example, after the terminal device 700 is powered on or after the processor 701 discovers the N second terminal devices based on the Device Discovery Protocol), if detecting, based on the Service Discovery Protocol, that N second terminal devices are playing M pieces of media content online, the processor 701 may obtain M network addresses from the N second terminal devices.

In some embodiments of the present invention, the terminal device 700 may be different from any one terminal device of the N second terminal devices. In a special scenario, the terminal device 700 may also be one terminal device of the N second terminal devices. The foregoing N may be equal to 1, 2, 3 or another positive integer.

The media content (for example, the M pieces of media content) mentioned in each embodiment of the present invention may refer to audio, a video or other media content.

In some embodiments of the present invention, the processor 701 may edit, according to various needed manners, the M pieces of media content obtained from the content server, to obtain first media content. For example, the processor 701 may perform a plurality of editing operations such as cutting, typesetting and/or inserting new content (for example, inserting a picture, a text, a speech and/or a video clip) on a part or all of content fragments in the M pieces of media content obtained from the content server, to obtain the first media content. The editing information generated according to the editing manner used when the first media content is obtained may be used to indicate various editing manners used when the first media content is obtained. Therefore, in a scenario in which no new content is inserted during the editing, the content server or another device may also obtain the first media content according to the editing information and the M pieces of media content. In a scenario in which new content is inserted during the editing, the content server or another device may also obtain the first media content according to the editing information, the inserted new content, and the M pieces of media content.

For example, the editing, by the processor 701, M pieces of media content obtained from the content server, to obtain first media content may include: cutting and/or typesetting a part or all of content fragments (one content fragment may be of 10 seconds, one second or another length) included in the M pieces of media content obtained from the content server, to obtain the first media content.

For another example, the editing, by the processor 701, the M pieces of media content obtained from the content server, to obtain first media content may include: typesetting a part or all of content fragments included in the M pieces of media content obtained from the content server, and inserting second media content into the content fragments to obtain the first media content. In this scenario, the method for sharing media content may further include: sending, by the terminal device 700, the inserted second media content to the content server, so that the content server synthesizes the first media content according to the editing information, the M pieces of media content, and the second media content.

After the terminal device 700 publishes the second network address on the social networking server, other users logging on to the social networking server may watch, based on the second network address, the first media content edited by the terminal device 700. Certainly, due to a difference between capabilities of terminal devices, the first media content watched by different users may be different in terms of resolution and bit rate.

It may be seen from the above description that in this embodiment, if detecting that N second terminal devices are playing M pieces of media content online, a terminal device 700 obtains M network addresses from the N second terminal devices; the terminal device 700 obtains, based on the M network addresses, the M pieces of media content from a content server, edit the M pieces of media content obtained from the content server, to obtain first media content, and generate the editing information according to an editing manner used when the first media content is obtained; the terminal device 700 sends the editing information to the content server, and receives a second network address sent by the foregoing content server; and the terminal device 700 publishes the second network address on a social networking server. Because an inter-device media content sharing mechanism is introduced, the terminal device 700 can edit, according to a user personalized requirement, media content that is being played by another device, and then share an address of the edited media content on the social networking server, which greatly enhances flexibility of user content sharing and user interactivity in a social networking services scenario. It is foreseeable that user participation in the content is greatly improved and interactivity between users is greatly enhanced. In addition, personalized media content on the network side is greatly enriched.

Figure 8:
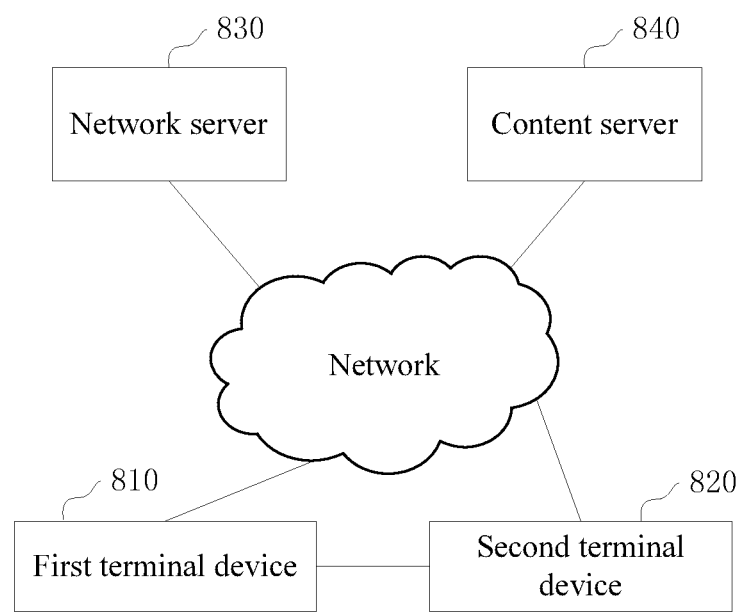
FIG. 8 is a schematic diagram of a content sharing system according to an embodiment of the present invention.

Referring to FIG. 8, the present invention further provides a content sharing system, which may include: a first terminal device 810, N second terminal devices 820 (that N is equal to 1 is used as an example in FIG. 8), a content server 840, and a social networking server 830.

The first terminal device 810 is configured to: if detecting that the N second terminal devices 820 are playing M pieces of media content online, obtain M network addresses from the N second terminal devices, where the M network addresses correspond one to one to the M pieces of media content, M is greater than or equal to N, and N and M are positive integers; obtain, based on the M network addresses, the M pieces of media content from the content server 840, edit the M pieces of media content obtained from the content server 840 to obtain first media content, and generate editing information according to an editing manner used when the first media content is obtained; send the editing information to the content server 840; receive a second network address sent by the content server 840, where the second network address is a network address corresponding to a first media content playlist which is generated by the content server 840 based on the editing information, where the first media content playlist is a media content playlist corresponding to the first media content; and publish the second network address on the social networking server 830.

The first terminal device 810 may be the terminal device 500, the terminal device 600 or the terminal device 700 described in the embodiments.

Figure 9:
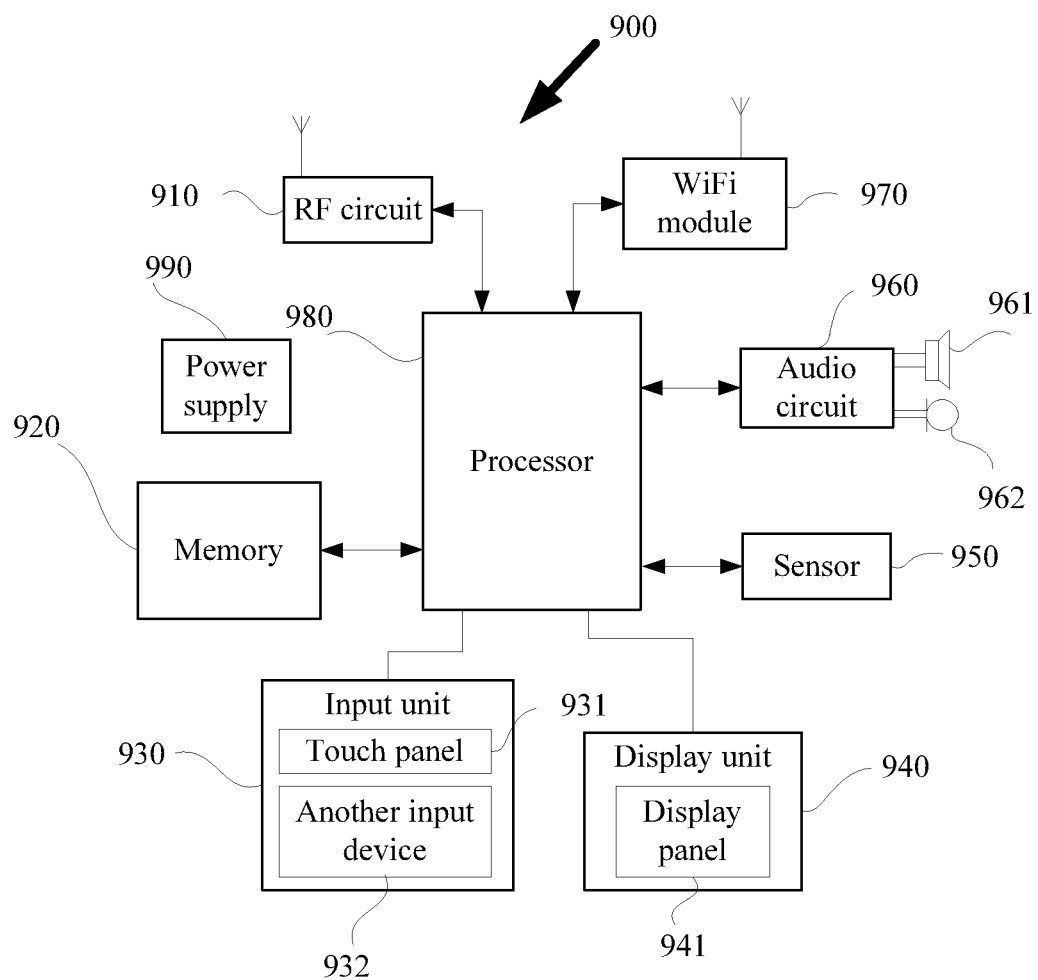
FIG. 9 is a schematic diagram of another terminal device according to an embodiment of the present invention.

An embodiment of the present invention further provides a schematic diagram of a terminal device 900, where the terminal device 900 may be configured to implement a part or all of functions of the first terminal device or the second terminal device in the foregoing embodiments. As shown in FIG. 9, for the convenience of description, only some parts that may be related to the embodiment of the present invention are shown. For undisclosed specific technical details, refer to the method part provided in the embodiments of the present invention.

FIG. 9 shows a block diagram of a partial structure of a terminal device that may be related to the terminal provided in the embodiments of the present invention. Referring to FIG. 9, the terminal device may include components such as a radio frequency (RF) circuit 910, a memory 920, an input unit 930, a wireless fidelity (WiFi) module 970, a display unit 940, a sensor 950, an audio circuit 960, a processor 980 and a power supply 990.

Persons of ordinary skill in the art may understand that the terminal device structure shown in FIG. 9 does not constitute a limitation on the terminal device and more or fewer components may be included, or some components are combined or components are laid out in different manners.

The RF circuit 910 may be configured to receive and transmit a signal during reception and transmission of information or during a calling process, in particular, after receiving downlink information from a base station, the RF circuit 910 sends the downlink information to the processor 980 for processing. In addition, the RF circuit 910 sends designed uplink data to the base station. Generally, the RF circuit includes but is not limited to an antenna, at least one amplifier, a transceiver, a coupler, a low noise amplifier (LNA), a duplexer, and the like. In addition, the RF circuit 910 may further communicate with a network and other devices through wireless communication. The wireless communication may use any one communications standard or protocol, which includes but is not limited to a global system for mobile communications (GSM), a general packet radio service (GPRS), a code division multiple access (CDMA), a wideband code division multiple access (WCDMA), a long term evolution (LTE), an electronic mail, a short messaging service (SMS), and the like.

The memory 920 may be configured to store a software program and a module, and the processor 980 runs the software program and the module stored in the memory 920 to perform various function applications and data processing of the terminal device. The memory 920 may mainly include a program storage area and a data storage area, where the program storage area may store an operating system, at least one function desired application (such as a sound playing function or an image playing function), and the like, and the data storage area may store data (such as audio data or a phone book) created according to use of the terminal device). In addition, the memory 920 may include a high speed RAM, and may further include a non-volatile memory, for example, at least one magnetic disk memory device, a flash memory device or another volatile solid-state memory device.

The input unit 930 may be configured to receive input number or character information and generate a key signal input related to user setting and function control of the terminal device 900. Specifically, the input unit 930 may include a touch panel 931 and another input device 932. The touch panel 931, also called a touch screen, can collect a touch operation on the touch panel 931 or near the touch panel 931 (for example, an operation on the touch panel 931 or near the touch panel 931 performed by a user by using a finger, a touch pen or any suitable object or accessory), and drive a corresponding connection apparatus according to a preset program. Optionally, the touch panel 931 may include a touch detection apparatus and a touch controller. The touch detection apparatus detects a touch direction of the user, detects a signal caused by a touch operation, and transmits the signal to the touch controller; and the touch controller receives touch information from the touch detection apparatus, converts the touch information into a contact coordinate, sends the contact coordinate to the processor 980, and can receive and execute a command sent by the processor 980. In addition, the touch panel 931 may be implemented by using various types, for example, resistor type, capacitor type, infrared type, and surface acoustic wave. The input unit 930 may also include another input device 932 besides the touch panel 931. Specifically, the another input device 932 may include but is not limited to one or more of a physical keyboard, a function key (such as a volume control button and a switch button), a trackball, a mouse, and an operation lever.

The display unit 940 may be configured to display information input by the user or information provided to the user and various menus of the terminal device. The display unit 940 may include a display panel 941. Optionally, the display panel 941 may be configured by using, for example, such as a liquid crystal display (LCD) and an organic light-emitting diode (OLED). Further, the touch panel 931 may cover the display panel 941. After detecting a touch operation on the touch panel 931 or near the touch panel 931, the touch panel 931 transmits the touch operation to the processor 980 to determine a type of a touch event, and then the processor 980 provides a corresponding visual output on the display panel 941 according to the type of the touch event. Though the touch panel 931 and the display panel 941 in FIG. 9 are used as two independent components to implement input and input functions of the terminal device, in some embodiments, the touch panel 931 and the display panel 941 may be integrated to implement the input and output functions of the terminal device.

The terminal device 900 may further include at least one sensor 950, for example, a light sensor, a motion sensor, and another sensor. Specifically, the light sensor may include an ambient light sensor and a proximity sensor, where the ambient light sensor may display brightness of the display panel 941 according to light and shade of the ambient light, and the proximity sensor may close the display panel 941 and/or a backlight when the terminal device is moved closer to an ear. Being one type of the motion sensor, an accelerometer sensor can detect a magnitude of acceleration in each direction (generally three axes), can detect a size and a direction of the gravity in a static state, and can be used to identify an application of a gesture (for example, switching between a horizontal screen and a vertical screen, a related game, and a magnetometer gesture calibration) of the terminal device and identify a related function through vibration (for example, a pedometer and a keystroke). Other sensors that can be configured on the terminal device such as a gyroscope, a barometer, a hygrometer, a thermometer, and an infrared sensor are not further described herein.

The audio circuit 960, a speaker 961, and a microphone 962 can provide an audio interface between the user and the terminal device. The audio circuit 960 can transmit, to the speaker 961, an electrical signal which is converted from received audio data, and the speaker 961 converts the electrical signal into a sound signal for outputting. In another aspect, the microphone 962 converts a collected sound signal into an electrical signal; after receiving the electrical signal, converting the electrical signal into audio data, and outputting the audio data to the processor 980 for processing, the audio circuit 960 sends the audio data is to another terminal device through the RF circuit 910, or outputs the audio data to the memory 920 for further processing.

The WiFi belongs to a short distance wireless transmission technology. By using the WiFi module 970, the terminal device may help the user to receive and send an electronic mail, browse a web page, and access streaming media. The WiFi module 970 enables the user to access the broadband Internet in a wireless manner. Though FIG. 9 shows the WiFi module 970, it may be understood that the WiFi module 970 is not a mandatory component of the terminal device 900 and may be omitted without changing the scope of the essence of the present invention.

The processor 980 is a control center of the terminal device, and is connected to all parts of the whole terminal device by using various interfaces and lines, and performs various functions and data processing of the terminal device by running or executing the software program and/or the module stored in the memory 920 and calling the data stored in the memory 920, so as to perform overall monitoring on the terminal device. Optionally, the processor 980 may include one or more processing units. Preferably, the processor 980 may integrate an application processor and a modem processor, where the application processor mainly processes an operating system, a user interface, an application, and the like, and the modem processor mainly processes wireless communication. It may be understood that the modem processor may also not be integrated into the processor 980.

The terminal device 900 further includes a power supply 990 (for example, a battery) supplying power to each component. Preferably, the power supply may be logically connected to the processor 980 through a power supply management system, so as to implement charging and discharging management and power consumption management by using the power supply management system. The terminal device 900 may further include a camera and a Bluetooth® module (not shown in the figure), which are not further described herein.

It should be noted that for brief description, the foregoing method embodiments are described as a combination of a series of actions. However, persons skilled in the art should understand that the present invention is not limited by a sequence of the described actions because some steps may be implemented in other sequences or concurrently according to the present invention. In addition, persons skilled in the art should also understand that the embodiments described in the specification are preferred embodiments and involved actions and modules may not be mandatory ones of the present invention.

In the foregoing embodiments, each embodiment is described with a different emphasis. For details about parts not detailed in one embodiment, reference may be made to the relevant descriptions of other embodiments.

In the several embodiments provided in the present application, it should be understood that the disclosed apparatus may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a universal serial bus (USB) flash drive, a read-only memory (ROM), a RAM, a removable hard disk, a magnetic disk, or an optical disc.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for sharing media content, comprising:
    obtaining, by a first terminal device, M network addresses and M pieces of break point information from N second terminal devices when detecting that the N second terminal devices currently play M pieces of media content online, wherein the M network addresses correspond one to one to the M pieces of media content, wherein the M pieces of break point information indicate time positions in the M pieces of media content at which a respective N second terminal currently plays the M pieces of media content at a time point when the N second terminal devices are detected by the first terminal device, wherein M is greater than N, and wherein N and M are positive integers;
    obtaining, from a content server and based on the M network addresses and the M pieces of break point information, portions of the M pieces of media content starting at the time positions indicated by the break point information and running through end positions of the media content;
    editing the M pieces of media content obtained from the content server to obtain first media content by:
        typesetting a part or all of content fragments comprised in the M pieces of media content obtained from the content server; and
        inserting second media content into the content fragments to obtain the first media content;
    generating editing information according to an editing manner used when the first media content is obtained;
    sending the editing information and capability information of the first terminal device to the content server, wherein the capability information comprises a resolution or bit rate capability of the first terminal device;
    sending, by the first terminal device, the inserted second media content to the content server to enable the content server to synthesize the first media content according to each of the editing information, the M pieces of media content, and the second media content,
    receiving a second network address from the content server, wherein the second network address is a network address that corresponds to a first media content playlist received from the content server, wherein the first media content playlist is a media content playlist that corresponds to the first media content, and wherein the media content playlist corresponds to the capability information of the first terminal device; and
    publishing the second network address on a social networking server, wherein the second network address enables users logging on to the social networking server to watch the first media content playlist that comprises the first media content.

2. The method of claim 1, wherein obtaining, by the first terminal device, the M network addresses from the N second terminal devices when detecting that the N second terminal devices currently play the M pieces of media content online comprises obtaining, by the first terminal device, the M network addresses from the N second terminal devices when detecting, based on a Service Discovery Protocol, that the N second terminal devices currently play the M pieces of media content online.

3. The method of claim 2, wherein obtaining the M network addresses from the N second terminal devices when detecting, based on the Service Discovery Protocol, that the N second terminal devices currently play the M pieces of media content online comprises obtaining, after the first terminal device logs on to the social networking server, the M network addresses from the N second terminal devices when detecting, based on the Service Discovery Protocol, that the N second terminal devices currently play the M pieces of media content online.

4. The method of claim 1, wherein the N second terminal devices play the first media content at different resolutions and bit rates.

5. The method of claim 1, wherein the first media playlist comprises new media content inserted by the first terminal device, and wherein the new media content inserted by the first terminal device comprises a picture.

6. The method of claim 1, wherein the first media playlist comprises new media content inserted by the first terminal device, and wherein the new media content inserted by the first terminal device comprises text.

7. The method of claim 1, wherein the first media playlist comprises new media content inserted by the first terminal device, and wherein the new media content inserted by the first terminal device comprises speech.

8. The method of claim 1, wherein the first media playlist comprises new media content inserted by the first terminal device, and wherein the new media content inserted by the first terminal device comprises a video clip.

9. The method of claim 1, wherein the first terminal device and the N second terminal devices all belong to a same local area network.

10. The method of claim 1, wherein editing the M pieces of media content obtained from the content server to obtain the first media content comprises performing a plurality of different operations on the M pieces of media content, and wherein the different operations comprise cutting, typesetting, and inserting new content.

11. The method of claim 1, wherein the M pieces of media content have different time durations.

12. The method of claim 1, wherein the M network addresses comprise M uniform resource locators.

13. A terminal device, comprising:
    a non-transitory computer readable medium having instructions stored thereon; and
    a computer processor coupled to the non-transitory computer readable medium and configured to execute the instructions, wherein the instructions cause the computer processor to:
    obtain M network addresses and M pieces of break point information from N second terminal devices when detecting that the N second terminal devices currently play M pieces of media content online, wherein the M network addresses correspond one to one to the M pieces of media content, wherein the M pieces of break point information indicate time positions in the M pieces of media content at which a respective N second terminal currently plays the M pieces of media content at a time point when the N second terminal devices are detected by the terminal device, wherein M is greater than N, and wherein N and M are positive integers;

obtain, from a content server and based on the M network addresses and the M pieces of break point information, portions of the M pieces of media content starting at the time positions indicated by the break point information and running through end positions of the media content;

edit the M pieces of media content obtained from the content server to obtain first media content by:
    typesetting a part or all of content fragments comprised in the M pieces of media content obtained from the content server; and
    inserting second media content into the content fragments to obtain the first media content;

generate editing information according to an editing manner used when the first media content is obtained;

send the editing information and capability information of the terminal device to the content server, wherein the capability information comprises a resolution or bit rate capability of the terminal device;

send the inserted second media content to the content server to enable the content server to synthesize the first media content according to each of the editing information, the M pieces of media content, and the second media content;

receive a second network address from the content server, wherein the second network address is a network address that corresponds to a first media content playlist received from the content server, wherein the first media content playlist is a media content playlist that corresponds to the first media content, and wherein the media content playlist corresponds to the capability information of the terminal device; and publish the second network address on a social networking server, wherein the second network address enables users logging on to the social networking server to watch the first media content playlist that comprises the first media content.

14. The terminal device of claim 13, wherein the instructions further cause the computer processor to be configured to obtain, after the terminal device logs on to the social networking server, the M network addresses from the N second terminal devices when detecting, based on a Service Discovery Protocol, that the N second terminal devices currently play the M pieces of media content online.

15. The terminal device of claim 13, wherein the instructions further cause the computer processor to be configured to generate the editing information according to an editing manner used when the first media content is obtained.

16. A content sharing system, comprising:
a content server;
a social networking server;
N second terminal devices coupled to the social networking server; and
a first terminal device coupled to the content server and the social networking server, wherein the first terminal device is configured to:

obtain M network addresses and M pieces of break point information from the N second terminal devices when detecting that the N second terminal devices currently play M pieces of media content online, wherein the M network addresses correspond one to one to the M pieces of media content, wherein the M pieces of break point information indicate time positions in the M pieces of media content at which a respective N second terminal currently plays the M pieces of media content at a time point when the N second terminal devices are detected by the first terminal device, wherein M is greater than N, and wherein N and M are positive integers;

obtain, from the content server and based on the M network addresses and the M pieces of break point information, portions of the M pieces of media content starting at the time positions indicated by the break point information and running through end positions of the media content;

edit the M pieces of media content obtained from the content server to obtain first media content by:
    typesetting a part or all of content fragments comprised in the M pieces of media content obtained from the content server; and
    inserting second media content into the content fragments to obtain the first media content;

generate editing information according to an editing manner used when the first media content is obtained;

send the editing information and capability information of the first terminal device to the content server, the capability information comprising a resolution or bit rate capability of the first terminal device;

send the inserted second media content to the content server to enable the content server to synthesize the first media content according to each of the editing information, the M pieces of media content, and the second media content;

receive a second network address from the content server, wherein the second network address is a network address that corresponds to a first media content playlist which is generated by the content server based on the editing information, wherein the first media content playlist is a media content playlist that corresponds to the first media content, and wherein the media content playlist corresponds to the capability information of the first terminal device; and publish the second network address on a social networking server, wherein the second network address enables users logging on to the social networking server to watch the first media content playlist that comprises the first media content.

\* \* \* \* \*